United States Patent
Matsubara

(10) Patent No.: US 9,475,380 B2
(45) Date of Patent: Oct. 25, 2016

(54) AIR GUIDE STRUCTURE

(71) Applicant: Nissan Motor Co., Ltd., Kanagawa (JP)

(72) Inventor: Takehide Matsubara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/383,030

(22) PCT Filed: Feb. 27, 2013

(86) PCT No.: PCT/JP2013/055093
§ 371 (c)(1),
(2) Date: Sep. 4, 2014

(87) PCT Pub. No.: WO2013/133097
PCT Pub. Date: Sep. 12, 2013

(65) Prior Publication Data
US 2015/0298540 A1 Oct. 22, 2015

(30) Foreign Application Priority Data
Mar. 6, 2012 (JP) .................. 2012-049059

(51) Int. Cl.
*B60K 13/02* (2006.01)
*B60K 13/06* (2006.01)
(Continued)

(52) U.S. Cl.
CPC ............... *B60K 13/02* (2013.01); *B60K 11/04* (2013.01); *B60K 11/08* (2013.01); *B60K 13/06* (2013.01); *B60R 19/48* (2013.01); *B60R 2019/486* (2013.01)

(58) Field of Classification Search
CPC ...... B60K 13/06; B60K 11/04; B60K 11/08; B60R 19/48; B60R 19/18; B60R 2019/188
See application file for complete search history.

(56) References Cited

U.S. PATENT DOCUMENTS

| | | | | |
|---|---|---|---|---|
| 4,516,650 A | * | 5/1985 | Yamaguchi | B60K 13/02 180/68.3 |
| 4,646,863 A | * | 3/1987 | Yamada | B60R 19/24 180/68.1 |

(Continued)

FOREIGN PATENT DOCUMENTS

| | | |
|---|---|---|
| DE | 102007015863 A1 | 10/2008 |
| DE | 102009039806 A1 | 3/2011 |

(Continued)

OTHER PUBLICATIONS

International Search Report for corresponding International Application No. PCT/JP2013/055093, mailed May 7, 2013 (2 pages).

(Continued)

*Primary Examiner* — J. Allen Shriver, II
*Assistant Examiner* — Brian Cassidy
(74) *Attorney, Agent, or Firm* — Osha Liang LLP

(57) ABSTRACT

An air guide structure has a bumper fascia extended in a vehicle width direction at a front end part of a vehicle and having an opening capable of collecting wind generated while the vehicle is running, a radiator arranged behind the bumper fascia, a bumper reinforce arranged between the bumper fascia and the radiator and forming an air passage in the vehicle width direction, and a closed space defined with a rear shield plate arranged on a rear side, side shield plates forwardly extended from left and right sides of the rear shield plate, respectively, a bottom shield plate arranged at lower parts of the rear shield plate and side shield plates, a ceiling shield plate arranged at an upper part opposite to the bottom shield plate, and a front shield plate spaced away from and faced toward the rear shield plate.

2 Claims, 7 Drawing Sheets

(51) Int. Cl.
  *B60R 19/48* (2006.01)
  *B60K 11/04* (2006.01)
  *B60K 11/08* (2006.01)

(56) References Cited

U.S. PATENT DOCUMENTS

| | | | | |
|---|---|---|---|---|
| 4,971,172 A | * | 11/1990 | Hoffman | B60K 13/02 180/68.3 |
| 4,984,350 A | * | 1/1991 | Hayashi | B60R 19/48 180/68.3 |
| 5,141,068 A | | 8/1992 | Mendicino | |
| 5,860,685 A | * | 1/1999 | Horney | B60K 13/02 180/68.1 |
| 5,901,672 A | * | 5/1999 | Suzuki | B60K 11/04 123/41.49 |
| 6,578,650 B2 | * | 6/2003 | Ozawa | B62D 25/084 180/68.1 |
| 6,945,576 B1 | * | 9/2005 | Arentzen | B60K 13/02 180/68.3 |
| 7,234,555 B2 | * | 6/2007 | Khouw | B60K 13/02 180/68.3 |
| 7,717,204 B2 | * | 5/2010 | Kondou | B60R 19/52 180/68.1 |
| 7,997,366 B2 | * | 8/2011 | Tanaka | B60K 13/02 180/232 |
| 8,201,651 B2 | * | 6/2012 | Salvesen | B60K 13/02 180/68.3 |
| 2012/0145272 A1 | * | 6/2012 | Chu | B60K 11/08 138/111 |

FOREIGN PATENT DOCUMENTS

| | | |
|---|---|---|
| EP | 0 451 916 A2 | 10/1991 |
| FR | 2929342 A1 | 10/2009 |
| JP | 9-88750 A | 3/1997 |
| JP | 2008-49735 A | 3/2008 |

OTHER PUBLICATIONS

Written Opinion for corresponding International Application No. PCT/JP2013/055093, mailed May 7, 2013 (3 pages).

International Preliminary Report on Patentability for corresponding International Application No. PCT/JP2013/055093, mailed Sep. 20, 2013 (8 pages).

* cited by examiner

AIR GUIDE STRUCTURE

TECHNICAL FIELD

The present invention relates to an air guide structure arranged at a front part of a vehicle.

BACKGROUND ART

A vehicle body structure that takes in wind produced during the driving of a vehicle and supplies the low-temperature wind through an inlet duct to an engine has been known (refer to, for example, Patent Literature 1).

The vehicle body structure mentioned in the Patent Literature 1 arranges an opening in a front face of a front bumper, defines a closed space under a front fender, and connects the closed space to an inlet duct of an engine. This configuration passes wind from the opening of the front bumper into the closed space and from there to the inlet duct and the engine.

CITATION LIST

Patent Literature

Patent Literature 1: Japanese Unexamined Patent Application Publication No. H09-88750

SUMMARY OF INVENTION

The related art, however, has a risk that, when the vehicle runs on a water-covered road, rainwater enters from the opening of the front bumper into the closed space, and from there, into the inlet duct.

To deal with this, an object of the present invention is to provide an air guide structure that suppresses, even when a vehicle runs on a water-covered road, the entering of rainwater and the like into an inlet duct of an engine of the vehicle.

The air guide structure according to the present invention includes: a bumper fascia that is extended in a vehicle width direction at a front end part of a vehicle and has an opening capable of collecting wind generated while the vehicle is running; a radiator that is arranged behind the bumper fascia; a bumper reinforce that is arranged between the bumper fascia and the radiator and forms an air passage in the vehicle width direction; a closed space that is defined with a rear shield plate arranged on a rear side, side shield plates forwardly extended from left and right sides of the rear shield plate, respectively, a bottom shield plate arranged at lower parts of the rear shield plate and side shield plates, a ceiling shield plate arranged at an upper part opposite to the bottom shield plate, and a front shield plate spaced away from and faced toward the rear shield plate and connected to the side shield plates, bottom shield plate, and ceiling shield plate, the closed space communicating with the air passage of the bumper reinforce; and an inlet port that is arranged at least one on a face of the bumper reinforce opposite to the radiator and communicates with the air passage, the closed space communicating with a primary opening of an inlet duct of an engine.

MODE OF IMPLEMENTING INVENTION

An embodiment of the present invention will be explained in detail with reference to the drawings. Through the drawings, "FR" indicates a front side of a vehicle, "RR" a rear side of the vehicle, "UPR" an upper side of the vehicle, "LWR" a lower side of the vehicle, "LH" a left side of the vehicle, and "RH" a right side of the vehicle.

Figure 1:
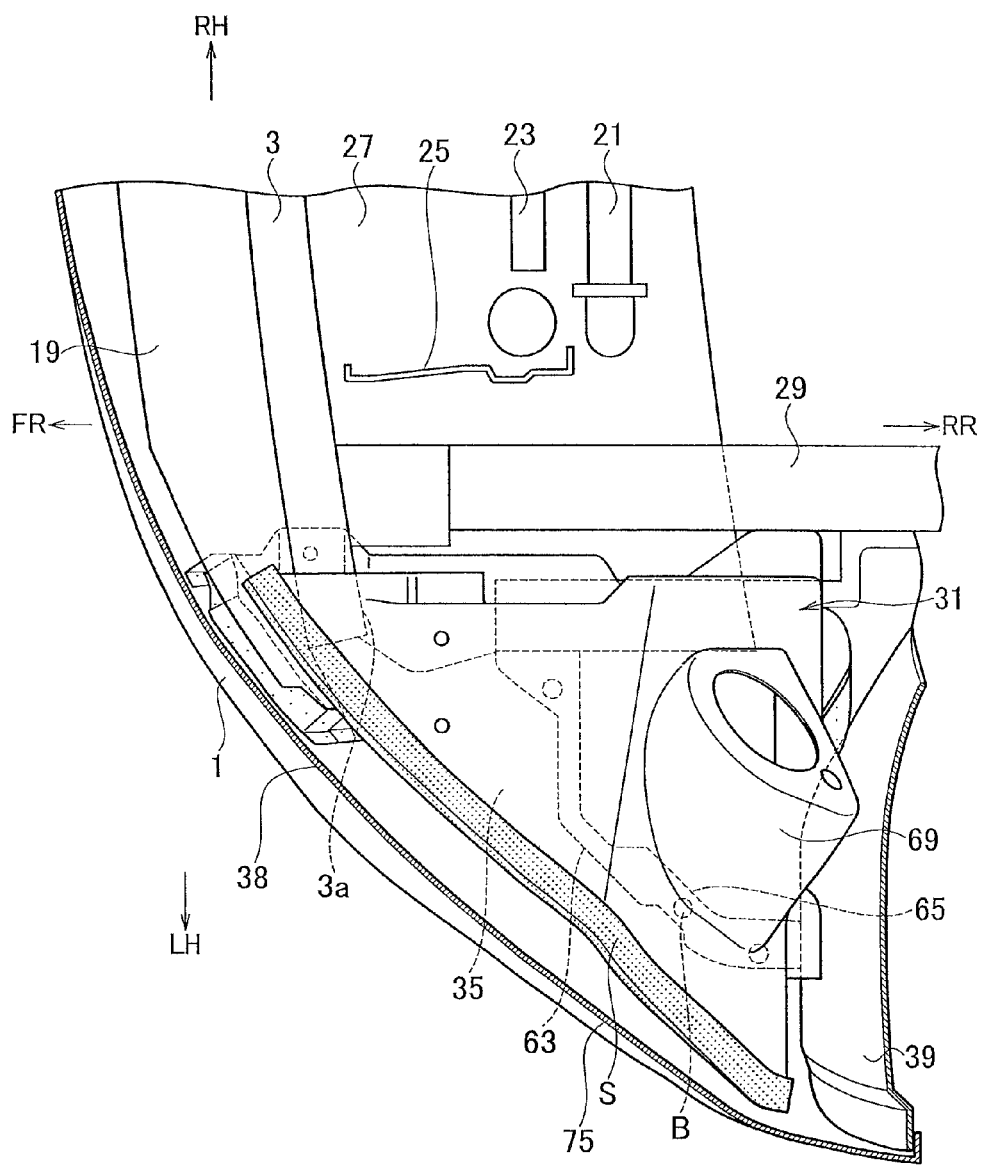
FIG. 1 is a plan view illustrating a left side of a front end part of a vehicle according to an embodiment of the present invention.
Figure 2:
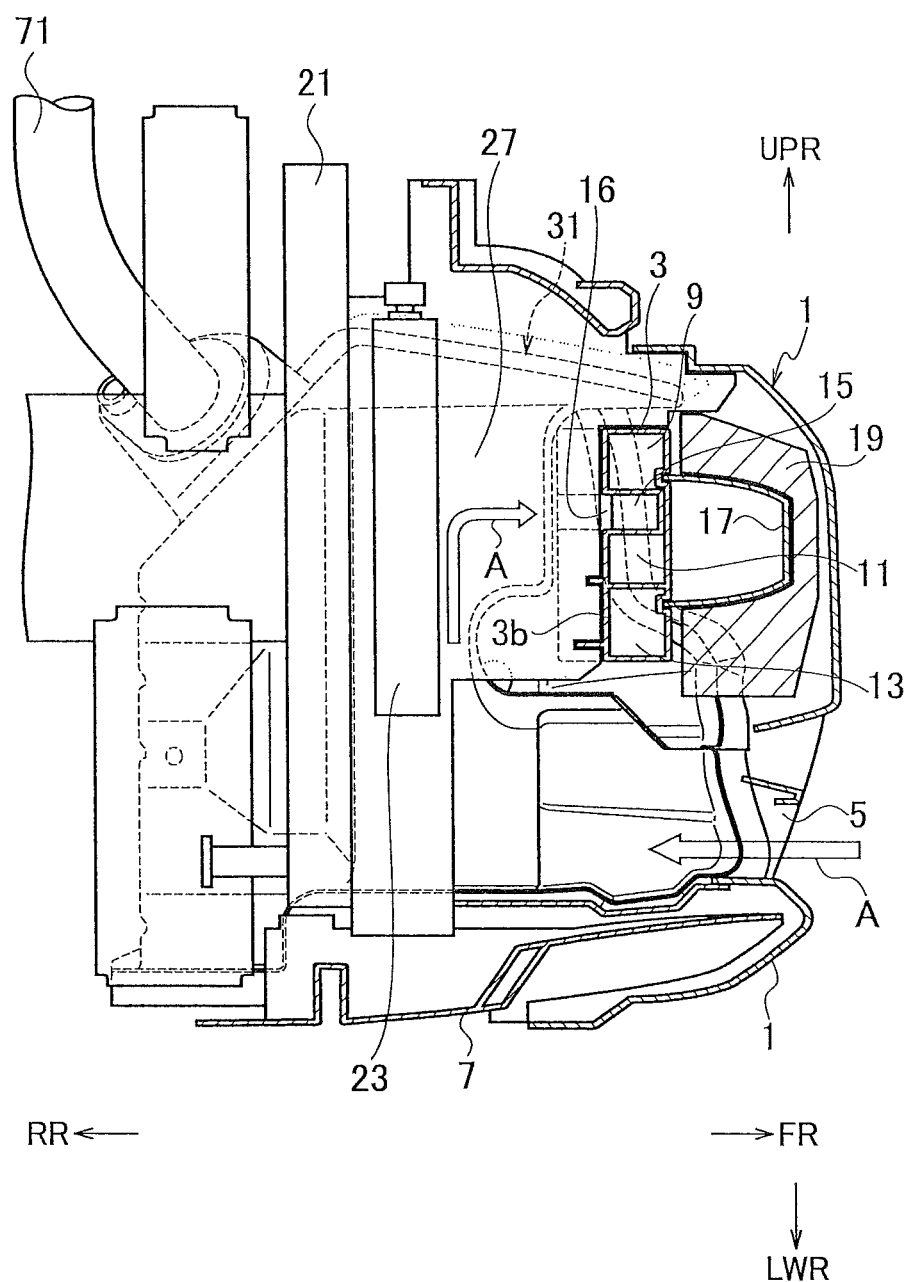
FIG. 2 is a sectional side view illustrating the part illustrated in FIG. 1.

As illustrated in FIGS. 1 and 2, arranged at a vehicle front end is a bumper fascia 1 extended in a width direction of a vehicle. Arranged behind the bumper fascia 1 is a bumper reinforce 3 extended in the vehicle width direction. Formed at a lower part of the bumper fascia 1 is an opening 5 through which wind A, which is generated while the vehicle is running, flows from the front toward the rear of the vehicle. Arranged at a lower end of the vehicle front is an under over 7.

The bumper reinforce 3 has three closed sectional parts in a vertical direction. Namely, there are, from the top to the bottom, a first closed sectional part 9, a second closed sectional part 11, and a third closed sectional part 13. The first and second closed sectional parts 9 and 11 are vertically spaced away from each other and the space between them is an air passage 15. The air passage 15 is extended in the vehicle width direction in which the bumper reinforce 3 is extended, to pass the wind A along the air passage 15.

As illustrated in FIG. 2, an entrance part of the space between the first and second closed sectional parts 9 and 11 is an inlet port 16. The inlet port 16 is arranged at least one in a face of the bumper reinforce 3 (a rear face 3b of the bumper reinforce 3) that faces a radiator 21. The inlet port 16 communicates with the air passage 15. More precisely, the air passage 15 is extended in the vehicle width direction as mentioned above and a back side thereof is open. A part of the back side of the air passage 15 serves as the inlet port 16.

A front side of the bumper reinforce 3 is fitted to a bumper absorber 17 having a U-like sectional shape. A front side of the bumper absorber 17 is provided with a shock absorber 19. Spaced away from the back of the bumper reinforce 3, there is the radiator 21. In front of the radiator 21, there is a condenser 23. From a side of the radiator 21 to the vicinity of the bumper reinforce 3, a radiator air guide 25 is extended in a front-rear direction. A section surrounded by the radiator 21, bumper reinforce 3, and radiator air guide 25 is a radiator front area 27. A side member 29 is arranged in the front-rear direction. A front end of the side member 29 is joined to the bumper reinforce 3. Defined at a left end of the vehicle front end is a closed space 31 substantially having a triangular shape on a plan view. A left end 3a of the bumper reinforce 3 is inserted into the closed space 31.

As illustrated in FIGS. 3 to 6, the closed space 31 is defined by a rear shield plate 33 arranged on a rear side, side shield plates 41 and 75 forwardly extended from left and right sides of the rear shield plate 33, respectively, a bottom shield plate 35 arranged at lower parts of the rear shield plate 33 and side shield plates 41 and 75, a ceiling shield plate 37 arranged at an upper part and faced toward the bottom shield plate 35, and a front shield plate 38 spaced away from and faced toward the rear shield plate 33 and connected to the side shield plates 41 and 75, bottom shield plate 35, and ceiling shield plate 37.

Figure 3:
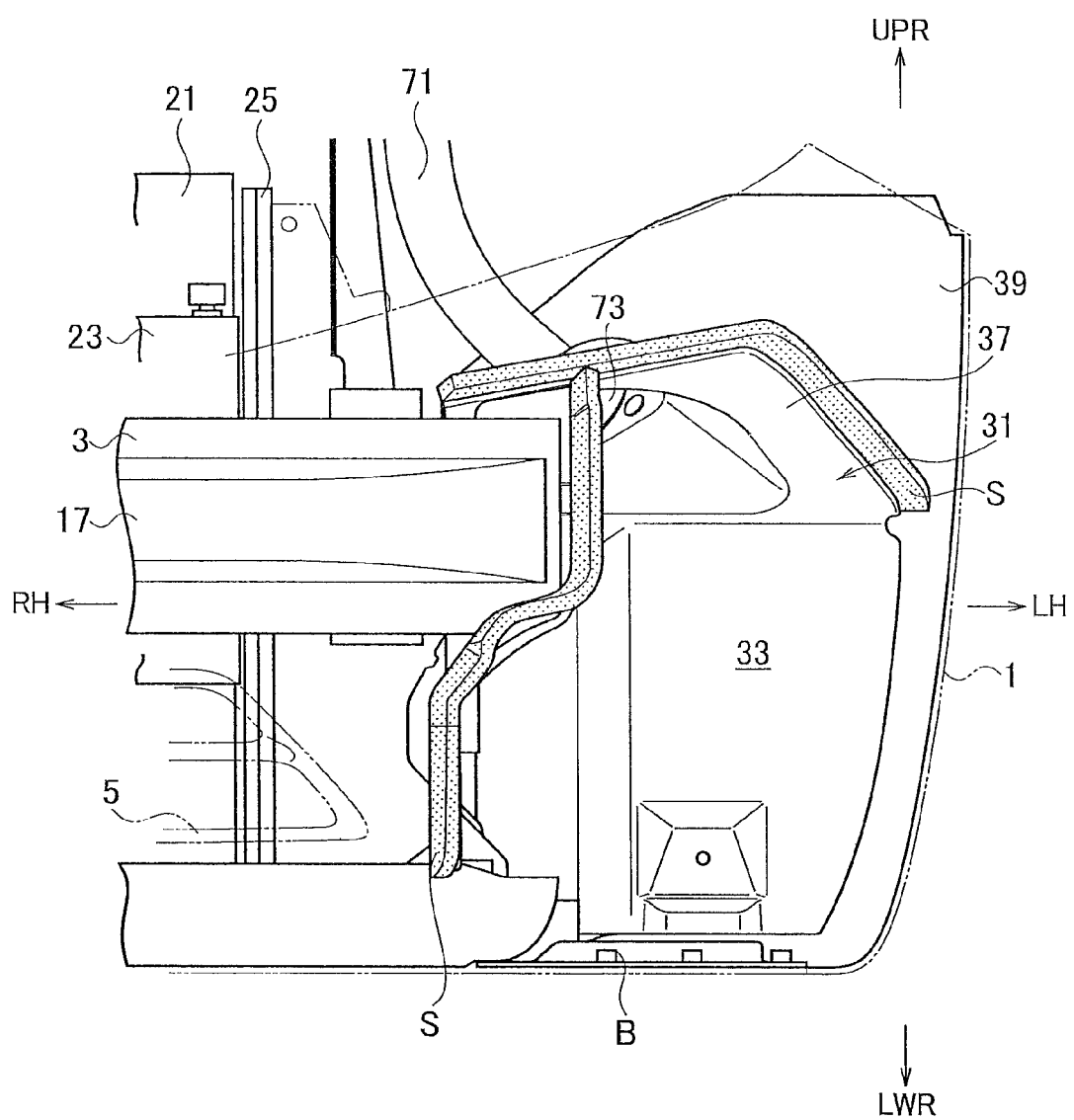
FIG. 3 is a front view illustrating the part illustrated in FIG. 1.
Figure 4:
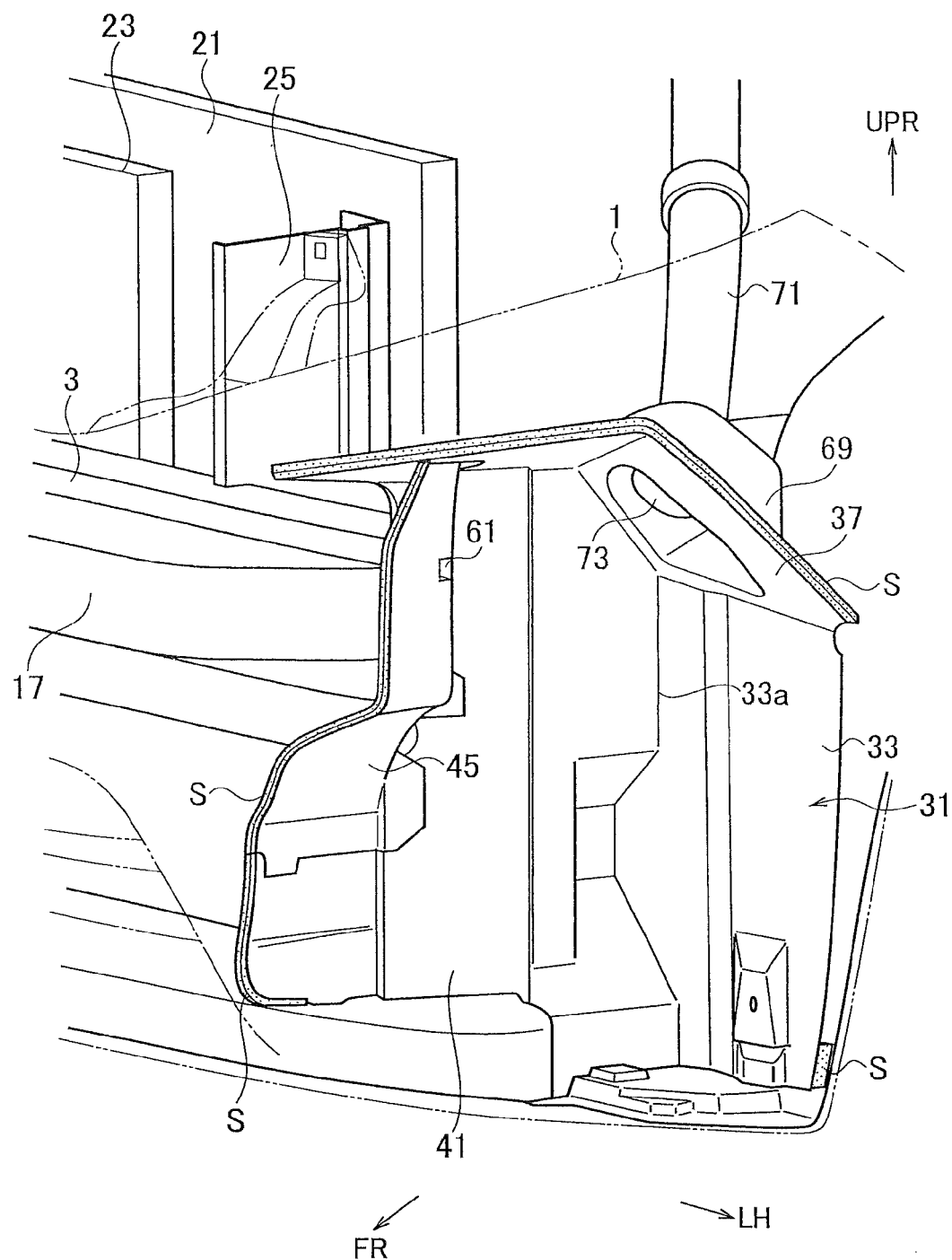
FIG. 4 is a perspective view illustrating a closed space of FIG. 1 obliquely seen from a front left side of FIG. 1.
Figure 5:
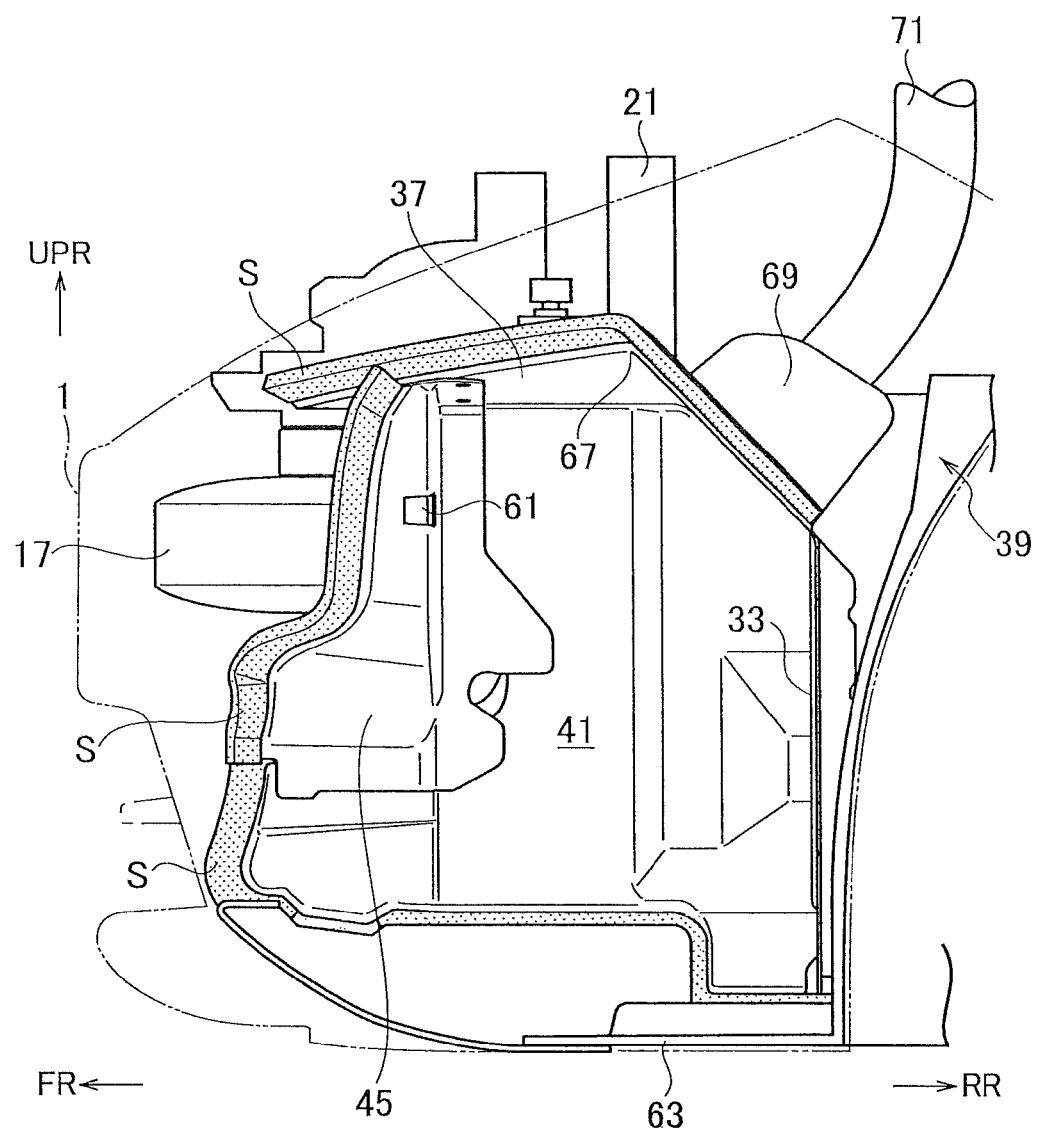
FIG. 5 is a left side view illustrating the closed space of FIG. 1.

The rear shield plate 33 is arranged, as illustrated in FIGS. 3 to 5, on a front side of a fender protector 39 and is extended in the vehicle width and vertical directions.

Figure 6:
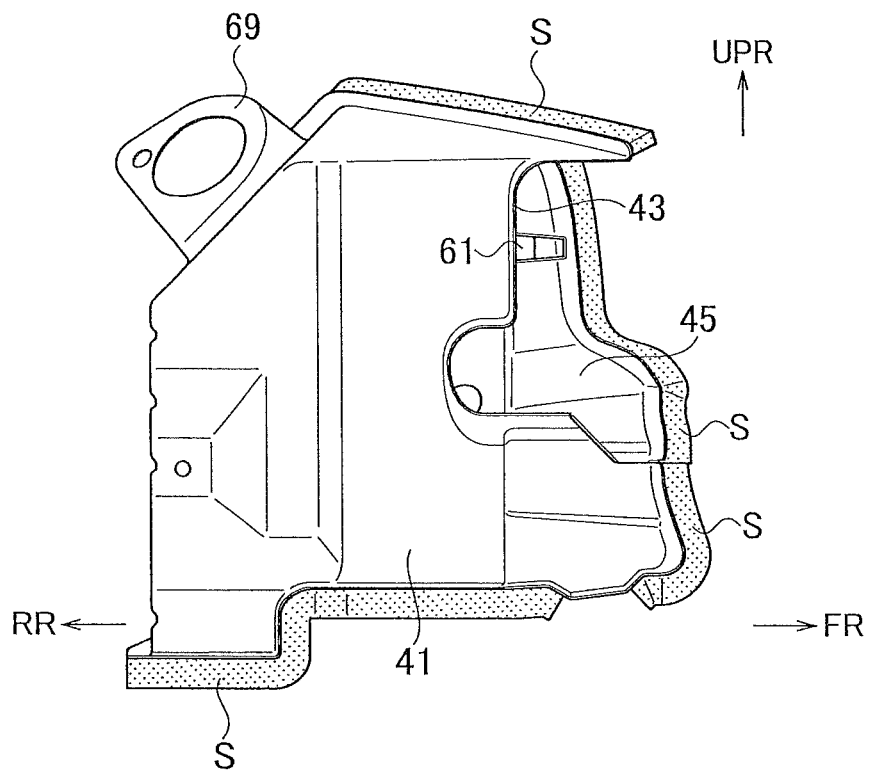
FIG. 6 is a side view illustrating the closed space according to the embodiment of the present invention seen from an inner side (right side) in a vehicle width direction.

The inner side shield plate 41 is arranged on an inner side in the vehicle width direction and is curved and forwardly extended from a vehicle width inner end 33a of the rear shield plate 33 as illustrated in FIGS. 4 to 6. As illustrated in FIG. 6 in detail, an upper front end of the inner side shield plate 41 has a cut 43 into which the left end 3a of the bumper reinforce 3 is inserted. As a result, the air passage 15 of the bumper reinforce 3 is inserted into the closed space 31. As illustrated in FIGS. 4 and 5, a back side (an outer side in the vehicle width direction) of the inner side shield plate 41 is connected to a reinforcing plate 45.

Figure 7:
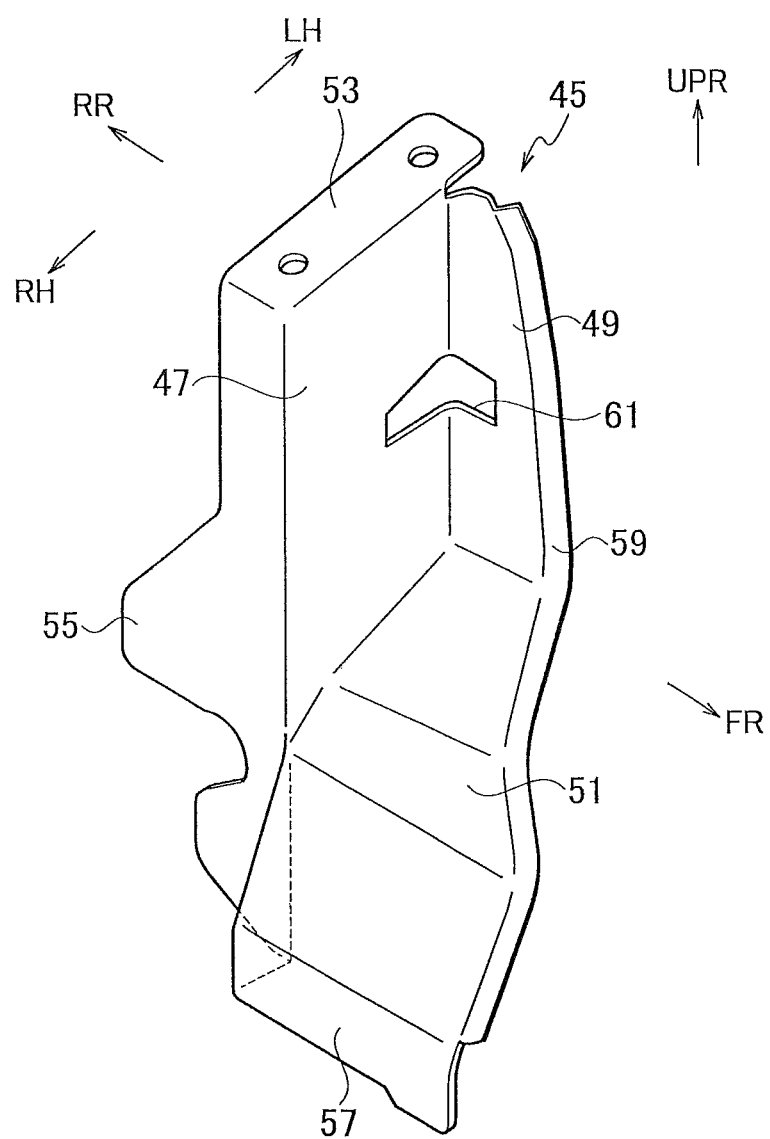
FIG. 7 is a perspective view illustrating a reinforcing plate according to the embodiment of the present invention.

The reinforcing plate 45 has, as illustrated in FIG. 7, a back face 47 extended in the vehicle width direction, a contact face 49 bent and forwardly extended from a left end of the back face 47, a lower face 51 formed at a lower part of the contact face 49, an upper flange 53 bent and extended from an upper end of the back face 47, a side flange 55 bent and backwardly extended from a right end of the back face 47, a lower flange 57 downwardly extended from a lower end of the lower face 51, and a front flange 59 bent from front ends of the contact face 49 and lower face 51. A corner (an intersection) between the contact face 49 and the back face 47 is provided with a lateral insertion hole 61. Through the cut 43 of the side shield plate 41 illustrated in FIG. 6, the left end 3a of the bumper reinforce 3 is inserted and is brought into contact with the contact face 49 of the reinforcing plate 45, so that the air passage 15 of the bumper reinforce 3 communicates with the insertion hole 61. Accordingly, the wind A passing through the air passage 15 of the bumper reinforce 3 flows through the insertion hole 61 of the reinforcing plate 45 into the closed space 31. The upper flange 53 is fastened to the ceiling shield plate 47, the side flange 55 and lower flange 57 are connected to the side shield plate 41, and the front flange 59 is adhered to a sponge S.

The bottom shield plate 35 includes, as illustrated in FIG. 1, a flange 63 formed at a front part of the fender protector 39 and a bottom face 65 of the bumper fascia 1 fastened to the flange 63. Namely, the flange 63 is forwardly extended from a lower end of the front part of the fender protector 39 and the bottom face 65 of the bumper fascia 1 is backwardly extended. A part where the flange 63 and bottom face 65 vertically overlap is fastened with a bolt B to form the bottom shield plate 35.

As illustrated in FIGS. 3 to 5, the ceiling shield plate 37 is bent into a downcurved shape on a side view and has a highest peak 67 at a center in a front-rear direction. From the peak 67, the ceiling shield plate 37 obliquely downwardly slants in front and rear directions. At a rear part of the ceiling shield plate 37, a connection port 69 obliquely upwardly protrudes. The connection port 69 is connected to a primary opening 73 of an inlet duct 71 of an engine. As illustrated in FIGS. 1, 3, 4, and 5, the ceiling shield plate 37 substantially has a triangular shape on a plan view and a left side (front part) thereof is adhered to a sponge S.

According to the embodiment, the outer side shield plate 75 arranged on the outer side in the vehicle width direction is served by the bumper fascia 1 as illustrated in FIG. 1. Namely, the sponge S adhered to the left side of the ceiling shield plate 37, the sponge S adhered to the front side of the reinforcing plate 45 joined to the inner side shield plate 41, the left end of the rear shield plate 33, and the left end of the bottom shield plate 35 are covered with the bumper fascia 1 from the outer side in the vehicle width direction, to form the outer side shield plate 75. The sponge S is arranged to improve tightness with respect to the outer side shield plate 75, i.e., the bumper fascia 1 and enhance airtightness of the closed space 31.

The front shield plate 38 is also served by the bumper fascia 1 as illustrated in FIG. 1. More precisely, a part of the bumper fascia 1 arranged on a vehicle front side of the side shield plate 75 serves as the front shield plate 38.

A flow of the wind A according to the embodiment will be explained.

As indicated with arrows in FIG. 2, the wind A flows, during the driving of the vehicle, from the opening 5 of the bumper fascia 1 to the radiator front area 27. The wind A enters through the inlet port 16 of the bumper reinforce 3 into the air passage 15, flows in the vehicle width direction, and passes through the left end 3a and the insertion hole 61 (refer to FIGS. 6 and 7) of the reinforcing plate 45 into the closed space 31. Thereafter, as illustrated in FIGS. 4 and 5, the wind A flows through the primary opening 73 of the inlet duct 71 of the engine connected to the ceiling shield plate of the closed space 31 into the inlet duct 71 and then into the engine.

Effects of the embodiment will be explained.

(1) The air guide structure according to the embodiment includes the bumper fascia 1 that is extended in a vehicle width direction at a front end part of a vehicle and has the opening 5 capable of collecting wind generated while the vehicle is running, the radiator 21 that is arranged behind the bumper fascia 1, the bumper reinforce 3 that is arranged between the bumper fascia 1 and the radiator 21 and forms the air passage 15 in the vehicle width direction, the closed space 31, and the inlet port 16 that is arranged at least one on the face 3b of the bumper reinforce 3 opposite to the radiator 21 and communicates with the air passage 15.

The closed space 31 is defined by the rear shield plate 33 arranged on a rear side, the side shield plates 41 and 75 forwardly extended from the left and right sides of the rear shield plate 33, respectively, the bottom shield plate 35 arranged at lower parts of the rear shield plate 33 and side shield plates 41 and 75, the ceiling shield plate 37 arranged at an upper part and faced toward the bottom shield plate 35, and the front shield plate 38 spaced away from and faced toward the rear shield plate 33 and connected to the side shield plates 41 and 75, bottom shield plate 35, and ceiling shield plate 37. The closed space 31 communicates with the air passage 15 of the bumper reinforce 3 and the primary opening 73 of the inlet duct 71 of an engine of the vehicle.

Accordingly, the wind A generated during the driving of the vehicle and entered from the opening 5 of the bumper fascia 1 passes through the air passage 15 of the bumper reinforce 3 into the closed space 31 and is supplied therefrom through the inlet duct 71 of the engine to the engine.

When the vehicle runs on a water-covered road, the structure mentioned above prevents rainwater on the road from easily entering the closed space 31 and effectively suppresses the entering of rainwater into the inlet duct 71.

The air passage 15 formed in the bumper reinforce 3 efficiently guides the low-temperature wind A entered into the opening 5 of the bumper fascia 1 to the closed space 31.

(2) The primary opening 73 of the inlet duct 71 connects and communicates with the ceiling shield plate 37.

Even if rainwater enters the closed space 31, the rainwater hardly reaches the ceiling shield plate 37. This further effectively suppress the entering of rainwater and the like into the inlet duct 71.

The present invention is not limited to the above-mentioned embodiment but is changeable and modifiable in various ways according to the scope of the present invention.

For example, the outer side shield plate 75 of the closed space 31 served by the bumper fascia 1 may be a separate shield plate like the side shield plate 41 on the inner side in the vehicle width direction.

Although the embodiment uses the bumper fascia 1 as the front shield plate 38, the front shield plate may be an independent shield plate like the side shield plate 41 that is on the inner side in the vehicle width direction.

According to the embodiment, the air passage 15 is a space formed on the back side of the bumper reinforce 3. The bumper reinforce 3 may have an internal closed sectional part to be used as the air passage. In this case, an inlet port is formed on the back face of the bumper reinforce 3 so that the wind A entered the radiator front area 27 is taken through the inlet port into the closed sectional part and is passed through the same.

The bottom shield plate 35 of the closed space 31 may be formed only of the flange 63 of the fender protector 39. In this case, the bottom of the closed space 31 is not entirely covered, and therefore, rainwater entering the closed space 31 is drained from the same, thereby further effectively suppressing the entering of rainwater into the inlet duct 71.

The contents of Japanese Patent Application No. 2012-049059 (filed on Mar. 6, 2012) are entirely cited herein.

Although the present invention has been explained in connection with the embodiment, the present invention is not limited by the descriptions mentioned herein. It will be apparent for those skilled in the art that the present invention allows various modifications and improvements.

INDUSTRIAL APPLICABILITY

The present invention is able to prevent, when a vehicle runs on a water-covered road, rainwater and the like on the road from easily entering a closed space of the vehicle, and therefore, is able to effectively suppress the entering of rainwater and the like into an inlet duct of an engine of the vehicle.

EXPLANATION OF REFERENCE NUMERALS

1: Bumper fascia
3: Bumper reinforce
5: Opening
15: Air passage
16: Inlet port
21: Radiator
31: Closed space
33: Rear shield plate
35: Bottom shield plate
37: Ceiling shield plate
38: Front shield plate
41, 75: Side shield plate
71: Inlet duct
73: Primary opening

The invention claimed is:

1. An air guide structure comprising:
a bumper fascia extended in a vehicle width direction at a front end part of a vehicle and having an opening capable of collecting wind generated while the vehicle is running;
a radiator arranged behind the bumper fascia;
a bumper reinforce arranged between the bumper fascia and the radiator and forming therein an air passage in the vehicle width direction;
a casing having a closed space therein, the casing comprising:
   a rear shield plate arranged on a rear side,
   side shield plates forwardly extended from left and right sides of the rear shield plate, respectively,
   a bottom shield plate arranged at lower parts of the rear shield plate and side shield plates,
   a ceiling shield plate arranged at an upper part opposite to the bottom shield plate, and
   a front shield plate spaced away from and faced toward the rear shield plate and connected to the side shield plates, bottom shield plate, and ceiling shield plate, the closed space communicating with the air passage of the bumper reinforce; and
at least one inlet port arranged on a face of the bumper reinforce opposite to the radiator and communicating with the air passage,
wherein the air passage communicates with a primary opening of an inlet duct of an engine through the closed space.

2. The air guide structure according to claim 1, wherein the primary opening of the inlet duct connects and communicates with the ceiling shield plate.

* * * * *